(12) United States Patent
Schultze

(10) Patent No.: US 6,918,837 B2
(45) Date of Patent: Jul. 19, 2005

(54) UNIVERSAL JOINT HAVING A BALANCING ARRANGEMENT AND BALANCING WEIGHT FOR SAME

(75) Inventor: Hans-Jürgen Schultze, Bottrop (DE)

(73) Assignee: Spicer Gelenkwellenbau GmbH & Co. KG, Essen (DE)

( * ) Notice: Subject to any disclaimer, the term of this patent is extended or adjusted under 35 U.S.C. 154(b) by 0 days.

(21) Appl. No.: 10/445,530

(22) Filed: May 27, 2003

(65) Prior Publication Data

US 2003/0224861 A1 Dec. 4, 2003

(30) Foreign Application Priority Data

May 28, 2002 (DE) .......................................... 102 23 848

(51) Int. Cl.[7] .................................................. F16D 3/40
(52) U.S. Cl. ...................................... 464/127; 464/130
(58) Field of Search ................................ 464/123, 127, 464/128, 136, 130, 180; 73/458

(56) References Cited

U.S. PATENT DOCUMENTS

| | | | | |
|---|---|---|---|---|
| 1,993,357 A | * | 3/1935 | Braun et al. ................. | 464/130 |
| 3,881,324 A | * | 5/1975 | Girquis .................... | 464/130 X |
| 4,317,341 A | * | 3/1982 | Krude | |
| 4,522,608 A | * | 6/1985 | Joyner | |
| 6,375,576 B1 | * | 4/2002 | Margerie ................. | 464/123 X |

FOREIGN PATENT DOCUMENTS

EP            385176            2/1990

* cited by examiner

*Primary Examiner*—Greg Binda
(74) *Attorney, Agent, or Firm*—MacMillan, Sobanski & Todd, LLC

(57) ABSTRACT

A universal joint has a balancing arrangement and a balancing weight for the same. Each yoke arm has a support bore centered on a bore axis, the support bore having a groove. A journal cross assembly includes four journals that intersect each other perpendicularly and bearing bushings that, respectively, have a bottom having an outer face. In these, a journal is, respectively, supported. Each bearing bushing is received in a support bore and is secured by means of a retaining ring, engaging in the groove, and by a balancing weight held between the retaining ring and the outer face of the bottom. This has radially, in reference to the bore axis, outside an annular fixing portion and following this, radially to the inside, in reference to the bore axis, a thicker balancing mass portion.

3 Claims, 2 Drawing Sheets

UNIVERSAL JOINT HAVING A BALANCING ARRANGEMENT AND BALANCING WEIGHT FOR SAME

BACKGROUND OF THE INVENTION

The invention relates to a universal joint having a balancing arrangement and to a balancing weight for this arrangement.

European Patent Application No. 385,176 A1 describes a balancing arrangement for a universal joint shaft in which a separate fixing ring, together with a connection tube, is fixed on a universal joint. The fixing ring encloses the connection tube at a partial length portion with distance. On the outer face of the fixing ring, individual balancing weights of different masses can be fixed by point welding. This arrangement does not, however, allow a destruction-free disassembly, especially during repairs of a universal shaft and the renewed balancing. Furthermore, for such an embodiment, a high method expenditure is needed as special devices are necessary with which the balancing weights can be welded on. A faulty attachment can only be corrected by a destruction of the connection with the balancing weight. Furthermore, the position of that position of the fixing ring, serving for attaching the balancing weight, is not optimal, as the largest imbalance lies in the universal joint itself. In short universal joint couplings, in which practically no connection tube is provided, up to now, only the possibility of removing of masses by means of boring is given, which has the disadvantage that a weakening results.

SUMMARY OF THE INVENTION

This invention has the object to provide a universal joint having a balancing arrangement which is easy to carry out and reproducible, and also allows in a simple way, during repair works, a balancing. Furthermore, it is an object of the this invention to propose a balancing weight for this arrangement.

This object is achieved according to the invention by a universal joint having a balancing arrangement comprising two joint yokes having, respectively, two yoke arms in which, respectively, a support bore, centered on a common bore axis, is arranged. The support bore has a groove. A journal cross assembly has four journals of which, respectively, two are arranged on a common axis, and which axes intersect each other perpendicularly. Bearing bushings are supported on the journals and have, respectively, a bottom and an outer face. A bearing bushing is received, respectively, in each of the support bores. A retaining ring is provided in each support bore and serves to fix the bearing bushing. To accomplish this, the retaining ring engages in the groove of the support bore. A balancing weight, formed as a disc, has radially, at the outside in reference to the bore axis, a fixing portion, arranged between the bottom and the retaining ring, and a balancing mass portion, representing a mass for balancing an imbalance.

Advantageous in this embodiment is that the balancing weights are attached there, where the imbalances in a universal joint shaft or universal joint are concentrated. Furthermore, it is advantageous that in case of repairs, an easier re-balancing is possible, as the balancing weights are mounted detachably. At the same time, it is easily possible to increase the balancing accuracy by means of exchanging the balancing weights with different masses during the balancing. Furthermore, by arranging to the universal joint, i.e., to the bore for receiving a bearing bushing, the imbalance is balanced there, where it is essentially produced.

In an embodiment of the invention, it is provided that the balancing weight is a circular disc with an outer circumferential face having a throughout flat face abutting the bottom of the bearing bushing and, seen in a top view facing away from the face, an annular face extending parallel to the face and continuous with the outer circumferential face and, when seen in a cross-section, having centrally a projection projecting beyond the annular face, which projection is the balancing mass portion. Alternatively thereto, it is provided that the balancing weight is formed as an annular disc having, on the inner circumference segments, forming the balancing mass portion.

Preferably, it is provided that the balancing mass portion is represented by a projection gently increasing radially from the annular face towards the bore axis.

The balancing weight is preferably made from a metal with a high density.

The object of the invention is, furthermore, solved by a balancing weight for a universal joint formed as a circular disc, having an outer circumferential face, an at least partially flat face, an annular face facing away from the face and starting from the outer circumferential face, and a projection as a balancing mass portion arranged inwards of the annular face and facing away from the flat face. A balancing weight is provided that can be very easily mounted in a universal joint.

Alternatively, the object, based on the invention, is solved by a balancing weight that is formed as an annular disc having an outer circumferential face, an at least partially flat face, an annular face facing away from the face and starting from the outer circumferential face, and segments forming the balancing mass portion that are arranged circumferentially distributed inwards of the annular face.

A universal joint shaft, in which a universal joint having a balancing arrangement according to the invention is provided, and two balancing weights of different design are schematically shown in the drawings and are described in detail by means of the same.

DETAILED DESCRIPTION OF THE PREFERRED EMBODIMENT

Figure 1:
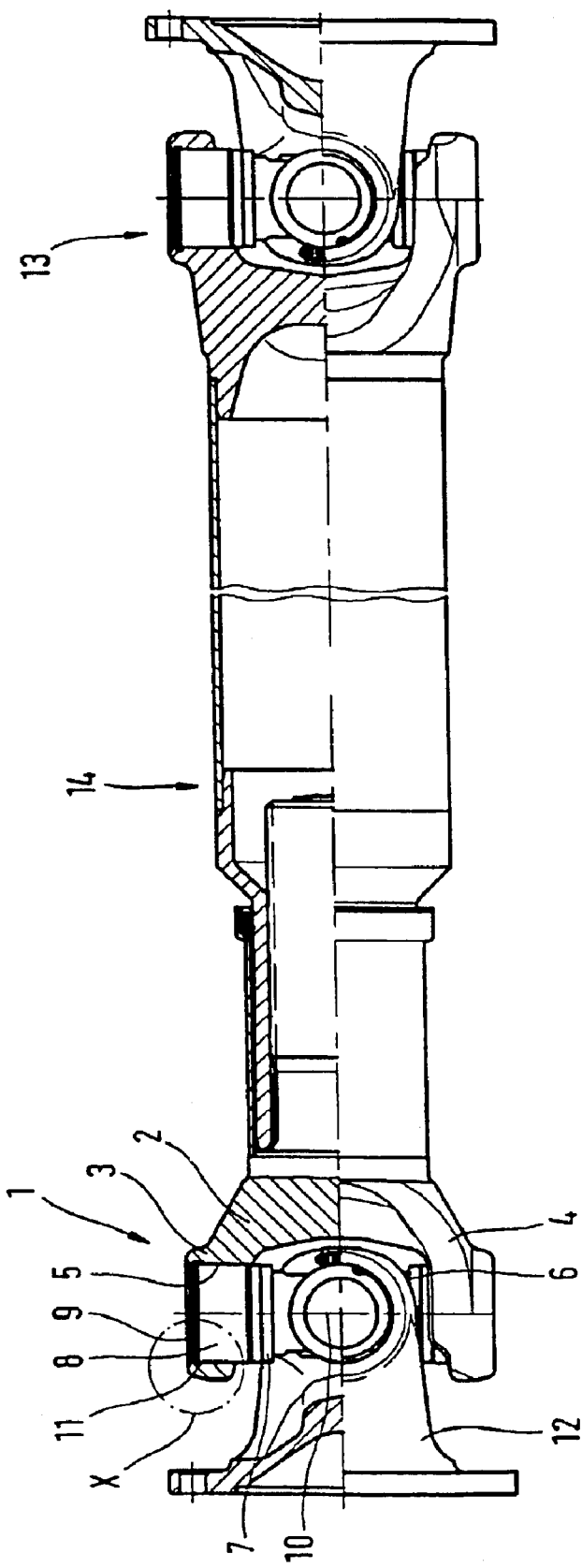
FIG. 1 shows a universal joint shaft, having a balancing arrangement according to the invention.

FIG. 1 shows a universal joint shaft including a first universal joint 1 having a first joint yoke 2 with a first yoke arm 3 and distanced thereto a second yoke arm 4. Through both yoke arms 3 and 4, respectively, a support bore 5 extends. Both support bores 5 (only one is illustrated) are centered on a bore axis 10. In the support bores 5 of the two yoke arms 3 and 4, a pair of bearing bushings 8, supported on respective journals 7, are received. These form, together with a journal cross 6, the first half of a journal cross assembly. The journal cross 6 has, furthermore, two further journals, which are arranged perpendicular to the first journals 7 and are arranged together with these in the same plane.

In the support bore 5, a groove 11 is provided. In this groove 11, a retaining ring 9 rests, supporting the bearing bushing 8 along the bore axis 10. The two further journals of the journal cross, supporting also bearing bushings, are held in the yoke arms of a second joint yoke 12 corresponding to the arrangement, described in connection with the first joint yoke 2. The above described components form together the first universal joint 1. A second universal joint 13 corresponding to the universal joint 1, is arranged on an end of a connection shaft 14, distanced from the first joint yoke 2, and which connection shaft 14 allowing, in a telescopic manner, a length adjustment.

Figure 2:
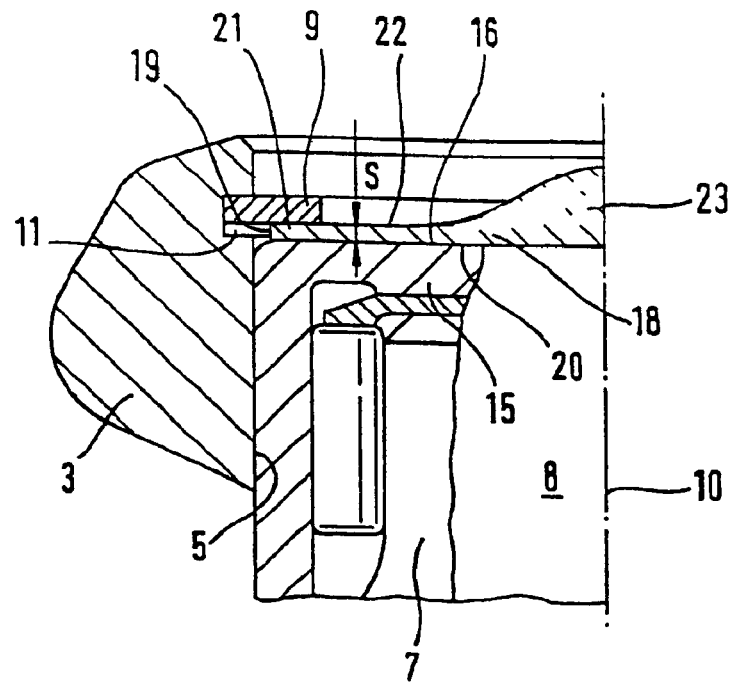
FIG. 2 shows an enlarged cross-sectional view of the detail X of FIG. 1 in an enlarged scale.

The balancing arrangement is shown in detail in FIG. 2. FIG. 2 shows a portion of the first yoke arm 3 of the first joint yoke 2 according to the detail X of FIG. 1 having the support bore 5. The support bore 5 has the bore axis 10. In the support bore 5, a journal 7 of a journal cross 6 is received by means of interposition of rolling members and a bearing bushing 8. The bearing bushing 8 has a bottom 15 with an outer face 16. In the support bore 5, the groove 11, extending around the bore axis 10, is provided in the area of the bottom 15. The balancing arrangement includes the retaining ring 9 that engages the groove 11. Furthermore, the balancing arrangement includes a balancing weight 18, formed as a disc, having a circular outer circumferential face 19.

The balancing weight 18 is formed rotational symmetrically in reference to the bore axis 10 of FIG. 2 and has a flat face 20 that abuts the outer face 16 of the bottom 15 of the bearing bushing 8. Starting from the outer circumferential face 19, the balancing weight 18 has initially a fixing portion 21, limited by the flat face 20, the outer circumferential face 19 and by an annular face 22 that is arranged parallel to the flat face 20 with the distance S. The annular face 22 is supported on the retaining ring 9. The annular face 22 is radially, in reference to the bore axis 10, partially covered by the retaining ring 9. In the direction towards the bore axis 10, a balancing mass portion 23, formed as a projection, is formed continuously with the annular face 22. An incline, slowly starting from the annular face 22, is provided. Different height dimensions of the projection provide different balancing mass portions 23 and, therefore, balancing weights of different masses. By the selection of the balancing weights 18 with different balancing mass portions 23, the produced imbalance in the area of the support bore 5 can be balanced by means of a mounting of a balancing weight 18 in the area of the support bore 5. During the balancing, for the determination of the imbalance, a disc can be initially inserted, which has the thickness S over its complete diameter range. After the determination of the imbalance, this disc is removed and it is substituted by a balancing weight 18 with an accordingly determined balancing mass portion. By means of the retaining ring 9 and the balancing weight 18, the journal cross 6 is centrally held in the direction of the bore axis 10 between the two yoke arms 3 and 4 of the first joint yoke 2.

Figure 3:
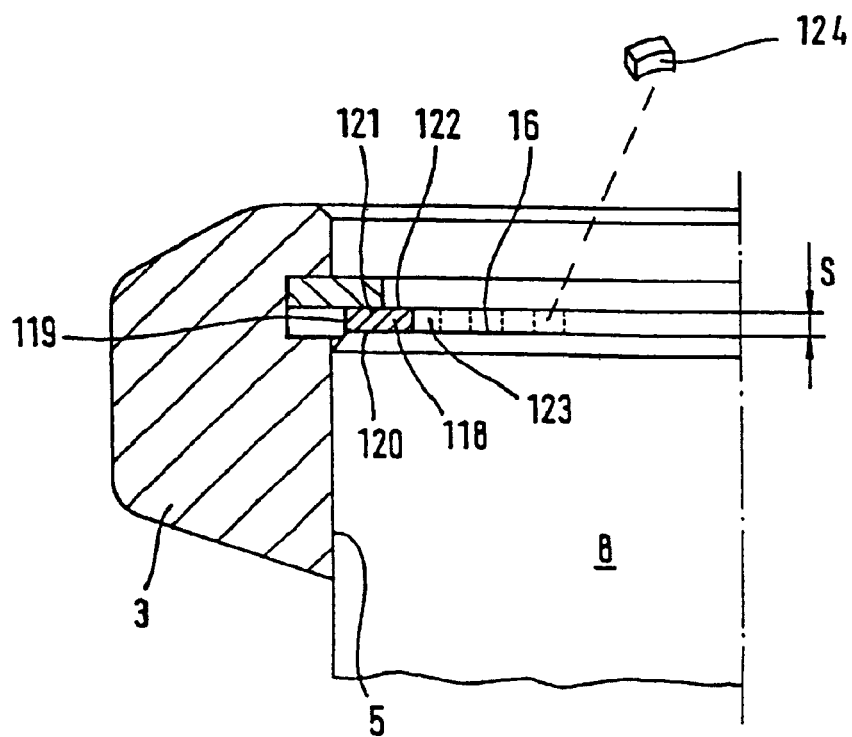
FIG. 3 shows a representation corresponding to the detail X of FIG. 2, however, having a different design of the balancing mass portion.

In FIG. 3, an alternative embodiment of the balancing weight is shown. Here, for the balancing weight and its partial areas, reference numerals are selected which are increased by 100 compared to the reference numerals in the embodiment of FIG. 2. Concerning the description, it is referred to FIGS. 1 or 2, respectively. Only the differences are described in the following. To the fixing portion 121 of the balancing weight 118 formed as an annular disc, segments (one of which is shown at 124) are connected radially inside and circumferentially distributed around the bore axis 10, which form the balancing mass portion 123. The segments 124 can, in this case, be formed in such a way that several ring portions are formed that can be removed to produce the necessary balancing mass.

What is claimed is:

1. A universal joint having a balancing arrangement comprising:

two joint yokes having, respectively, two yoke arms in which, respectively, a support bore, centered on a common bore axis, is arranged, the support bore having a groove;

a journal cross assembly having four journals of which, respectively, two are arranged on a common axis, which axes intersect each other perpendicularly, having bearing bushings having, respectively, a bottom and an outer face, and in which bearing bushes, respectively, a journal is supported, wherein, respectively, the bearing bushings are received in the support bores;

a retaining ring provided in each support bore and serving to fix the bearing bushing and for this, engaging in the groove of the support bore; and a balancing weight, formed as a disc, having radially, at the outside in reference to the bore axis, a fixing portion arranged between the bottom and the retaining ring, the balancing weight also including a balancing mass portion having a thickness that increases radially from the fixing portion towards the bore axis representing a mass for balancing an imbalance.

2. A universal joint according to claim 1, characterized in that the balancing weight is a circular disc with an outer circumferential face having a throughout flat face abutting the bottom of the bearing bushing and an annular race extending parallel to the flat face and continuous with the outer circumferential face and having the balancing mass portion projecting beyond the annular face.

3. A universal joint according to claim 2, characterized in that the balancing mass portion is represented by a projection having a thickness that increases radially from the fixing portion towards the bore axis.

* * * * *